(12) United States Patent
Guo et al.

(10) Patent No.: US 10,262,240 B2
(45) Date of Patent: Apr. 16, 2019

(54) FAST DEEP NEURAL NETWORK TRAINING

(71) Applicant: Microsoft Technology Licensing, LLC, Redmond, WA (US)

(72) Inventors: Yandong Guo, Bellevue, WA (US); Yuxiao Hu, Bellevue, WA (US); Christopher J Buehler, Seattle, WA (US); Cornelia Carapcea, Seattle, WA (US); Lei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 15/676,077

(22) Filed: Aug. 14, 2017

(65) Prior Publication Data

US 2019/0050689 A1 Feb. 14, 2019

(51) Int. Cl.
*G06K 9/36* (2006.01)
*G06K 9/62* (2006.01)
(Continued)

(52) U.S. Cl.
CPC ............. *G06K 9/6269* (2013.01); *G06K 9/66* (2013.01); *G06N 3/04* (2013.01); *G06N 3/08* (2013.01)

(58) Field of Classification Search
CPC ...... G06K 9/66; G06K 9/6269; G06K 9/6256; G06K 9/6267; G06N 99/005; G06N 3/04; G06N 3/08
See application file for complete search history.

(56) References Cited

U.S. PATENT DOCUMENTS 9,262,724 B2   2/2016   Kingsbury et al.
9,418,334 B2   8/2016   Sainath et al.
(Continued)

FOREIGN PATENT DOCUMENTS

CN    103945533 A    7/2014
WO    2017055412 A1  4/2017

OTHER PUBLICATIONS

Yan, et al., "HD-CNN: Hierarchical Deep Convolutional Neural Network for Image Classification", In Proceedings of International Conference on Computer Vision, Dec. 11, 2015, 8 pages.
(Continued)

*Primary Examiner* — Amir Alavi
(74) *Attorney, Agent, or Firm* — Schwegman Lundberg & Woessner, P.A

(57) ABSTRACT

Methods, systems, and computer programs are presented for training a deep neural network (DNN). One method includes an operation for training a predecessor network defined for image recognition of items, where parameters of a predecessor classifier are initialized with random numbers sampled from a predetermined distribution, and the predecessor classifier utilizes an image-classification probability function without bias. The method further includes an operation for training a successor network defined for image recognition of items in a plurality of classes, where parameters of a successor classifier are initialized with parameters learned from the predecessor network, and the successor classifier utilizes the image-classification probability function without bias. Further, the method includes operations for receiving an image for recognition, and recognizing the image utilizing the successor classifier.

20 Claims, 9 Drawing Sheets

(51) Int. Cl.
*G06K 9/66* (2006.01)
*G06N 3/04* (2006.01)
*G06N 3/08* (2006.01)

(56) References Cited

U.S. PATENT DOCUMENTS

| | | | | |
|---|---|---|---|---|
| 9,916,538 | B2* | 3/2018 | Zadeh | G06N 7/005 |
| 2013/0229545 | A1* | 9/2013 | Bigioi | G06K 9/00228 |
| | | | | 348/222.1 |
| 2014/0201126 | A1* | 7/2014 | Zadeh | G06K 9/627 |
| | | | | 706/52 |
| 2014/0214419 | A1* | 7/2014 | Rao | G10L 15/063 |
| | | | | 704/240 |
| 2015/0235097 | A1* | 8/2015 | Wang | G06K 9/00865 |
| | | | | 382/159 |
| 2016/0210533 | A1 | 7/2016 | Kiapour et al. | |
| 2018/0150728 | A1* | 5/2018 | Vandat | G06K 9/6278 |
| 2018/0225552 | A1* | 8/2018 | Bai | G06K 9/4604 |

OTHER PUBLICATIONS

Bui, et al., "Object Recognition Using Deep Convolutional Features Transformed by a Recursive Network Structure", In Journals of IEEE Access, vol. 4, Retrieved on: Jun. 28, 2017, pp. 10059-10066.
He, et al., "Deep residual learning for image recognition", In Proceedings of the IEEE Conference on Computer Vision and Pattern Recognition, Jun. 26, 2016, pp. 770-778.
Karayev, et al., "Recognizing image style", In Proceedings of the British Machine Vision Conference, Sep. 2014, 20 pages.
Krizhevsky, et al., "Imagenet classification with deep convolutional neural networks", In Proceedings of the 25th International Conference on Neural Information Processing Systems, Dec. 3, 2012, pp. 1-9.
Nilsback, et al., "Automated flower classification over a large number of classes", In Proceedings of the Indian Conference on Computer Vision, Graphics and Image Processing, Dec. 16, 2008, 8 pages.
Russakovsky, et al., "ImageNet Large Scale Visual Recognition Challenge", In International Journal of Computer Vision, vol. 115, Issue 3, Dec. 2015, pp. 1-43.
Yosinski, et al., "How transferable are features in deep neural networks", In Proceedings of the 27th International Conference on Neural Information Processing Systems, Dec. 8, 2014, pp. 1-9.
Zhou, et al., "Learning deep features for scene recognition using places database", In Proceedings of the 27th International Conference on Neural Information Processing Systems, Dec. 8, 2014, pp. 1-9.
Oquab, et al., "Learning and Transferring Mid-level Image Representations Using Convolutional Neural Networks", In IEEE Conference on Computer Vision and Pattern Recognition, Jun. 23, 2014, pp. 1717-1724.
"International Search Report and Written Opinion Issued in PCT Application No. PCT/US2018/038648", dated Sep. 13, 2018, 12 Pages.
Wagner, et al., "Learning Convolutional Neural Networks from Few Samples", In IEEE International Joint Conference on Neural Networks, dated Aug. 4, 2013, 7 Pages.

* cited by examiner

FEATURE SPHERE

CLASSIFIER

PROBABILITY SAMPLE BELONGS TO $K^{TH}$ CLASS $$y_k(\mathbf{x}_i, \mathbf{w}, b) = \frac{\exp \mathbf{w}_k^T \phi(\mathbf{x}_i) + b_k}{\sum_j \left(\exp \mathbf{w}_j^T \phi(\mathbf{x}_i) + b_j\right)}$$

FAST DEEP NEURAL NETWORK TRAINING

TECHNICAL FIELD

The subject matter disclosed herein generally relates to methods, systems, and programs for improving the training time of machine-learning programs and, more particularly, training deep neural networks (DNN).

BACKGROUND

Machine-learning tools are being used for many complex applications to analyze large amounts of data, such as for image and speech recognition, and one of those tools is the deep neural network (DNN), which has demonstrated promising performance in many domains. DNNs are trained with sample data before they can act as classifiers. However, oftentimes, the DNNs have to be retrained to fine-tune performance or to assimilate larger amounts of training data.

In most situations, training a DNN involves solving a non-convex optimization problem with no analytical solution. Typically, solutions are based on solving this problem via iterative procedures, e.g., stochastic gradient descent (SGD). Despite recent progress in computing infrastructure and implementation optimization, it may still take hours, or even up to days or weeks to train a deep neural network, making hard to retrain and inflexible.

Recognizing people in images is a task that is easy for humans but much harder for computers. Being capable of recognizing a substantial number of individuals with high precision and high recall is of great value in many practical applications, such as surveillance, security, photo tagging, and celebrity recognition.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
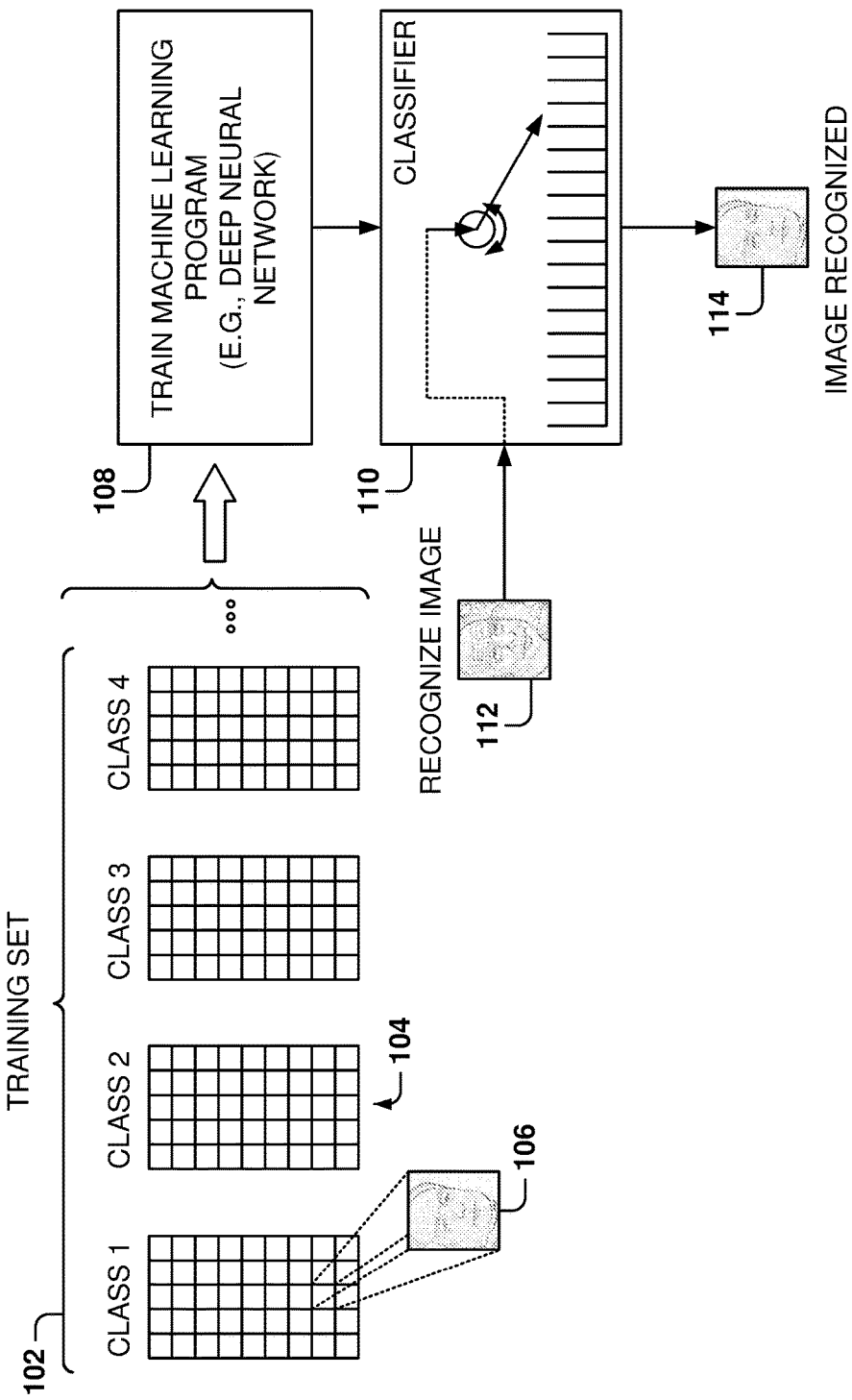
FIG. 1 illustrates the training of a classifier, according to some example embodiments.

Example methods, systems, and computer programs are directed to training a deep neural network (DNN). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The term "image recognition" may sound like it only involves one task, but in reality, image recognition is often geared to specific tasks, such as recognizing people, flowers, animals, places, monuments, fruits, or items in a refrigerator. One method for recognizing images is by using deep neural networks (DNN) to classify (i.e., recognize) items in images.

A method used for initial condition construction of a DNN includes leveraging an existing, already-trained neural network with similar structure, which has been trained for general purpose tasks and then fine tune the new neural network to the particular desired task. In some previous implementations, at the initial stage, the lower-level layers of the model to be trained are typically set to have the same parameters as the pre-trained model, while the parameters of the last layer are initialized to be random numbers sampled from certain distributions (usually Gaussian). This is due mainly to the lower-level layers being more general, while the last (e.g., top) layer is focused on a specific task. For example, for tasks including Flickr-style estimation (e.g., utilizes the Flicker data set), flower recognition, and places recognition, data scientists have trained the network by fine tuning an existing neural network trained for general image recognition.

Embodiments presented herein show how to train classifiers quickly while maintaining or improving the accuracy of the classifiers, such as by training the neural network in a supervised learning scenario. As used herein, the initial network to be trained is called the predecessor network, and the second neural network, trained based on the predecessor network, is called the successor network. The predecessor network is modified by eliminating the use of bias in the classifier, and the classifier of the successor network is initialized during the training phase based on the parameters learned from the predecessor network. The results are neural networks that train much faster while maintaining accuracy.

In one example, a method includes training a predecessor network defined for image recognition of items, the training of the predecessor network further comprising initializing parameters of a predecessor classifier with random numbers sampled from a predetermined distribution, and utilizing, by the predecessor classifier, an image-classification probability function without bias. The method further includes an operation for training a successor network defined for image recognition of items in a plurality of classes, the training of the successor network further comprising initializing parameters of a successor classifier with parameters learned from the predecessor network, and utilizing, by the successor classifier, the image-classification probability function without bias. The method further includes operations for receiving an image for recognition, and for recognizing the image utilizing the successor classifier.

In another aspect, a system includes a memory comprising instructions, and one or more computer processors. The instructions, when executed by the one or more computer processors, cause the one or more computer processors to perform operations comprising: training a predecessor network defined for image recognition of items, the training of the predecessor network further comprising initializing parameters of a predecessor classifier with random numbers sampled from a predetermined distribution, and utilizing, by the predecessor classifier, an image-classification probability function without bias; training a successor network defined for image recognition of items in a plurality of classes, the training of the successor network further comprising initializing parameters of a successor classifier with parameters learned from the predecessor network, and utilizing, by the successor classifier, the image-classification probability function without bias; receiving an image for recognition; and recognizing the image utilizing the successor classifier.

In another aspect, a non-transitory machine-readable storage medium including instructions that, when executed by a machine, cause the machine to perform operations comprising: training a predecessor network defined for image recognition of items, the training of the predecessor network further comprising initializing parameters of a predecessor classifier with random numbers sampled from a predetermined distribution, and utilizing, by the predecessor classifier, an image-classification probability function without bias; training a successor network defined for image recognition of items in a plurality of classes, the training of the successor network further comprising initializing parameters of a successor classifier with parameters learned from the predecessor network, and utilizing, by the successor classifier, the image-classification probability function without bias; receiving an image for recognition; and recognizing the image utilizing the successor classifier.

FIG. 1 illustrates the training of a classifier, according to some example embodiments. A machined-learning algorithm is designed for recognizing faces, and a training set 102 includes data that maps a sample to a class 104 (e.g., a class includes all the images from one person). The classes may also be referred to as labels. Although embodiments presented herein are presented with reference to face recognition, the same principles may be applied to train machine-learning programs used for recognizing any type of items.

The training set 102 includes a plurality of images of persons (e.g., image 106), and each image is associated with one of the persons to be recognized (e.g., a class). The machine-learning program is trained with the training data to generate a classifier 110 operable to recognize images. In some example embodiments, the machine-learning program is a DNN.

When an input image 112 is to be recognized, the classifier 110 analyzes the input image 112 to identify the class (e.g., person 114) corresponding to the input image 112.

Figure 2:
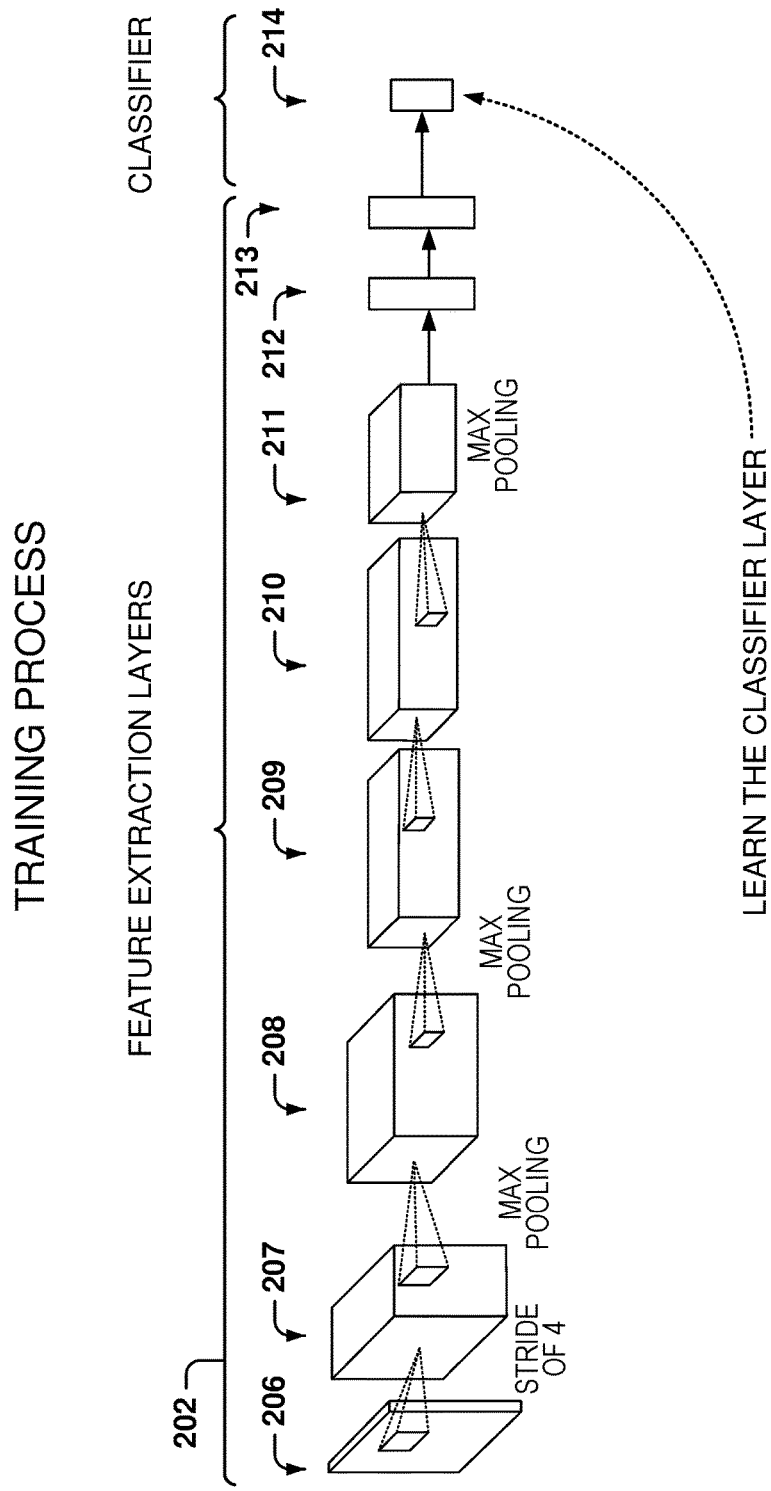
FIG. 2 illustrates the feature-extraction process and the classifier training, according to some example embodiments.

FIG. 2 illustrates the feature-extraction process and classifier training, according to some example embodiments. Training the classifier may be divided into feature extraction layers 202 and classifier layer 214. Each image is analyzed in sequence by a plurality of layers 206-213 in the feature-extraction layers 202.

With the development of deep convolutional neural networks, the focus in face recognition has been to learn a good face feature space, in which faces of the same person are close to each other, and faces of different persons are far away from each other. For example, the verification task with the LFW dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 214. In FIG. 2, the data travels from left to right and the features are extracted. The goal of training the neural network is to find the parameters of all the layers that make them adequate for the desired task.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

As discussed in more detail below, training of a neural network may be greatly accelerated by leveraging the parameters from a pre-trained neural network (e.g., predecessor network) to find the parameters for a successor network.

In some methods, the last operation in training is finding the parameters for the classifier 214, which is initialized by using random samplings because there is no knowledge on the function used by the classifier. In some example embodiments, the classifier 214 is initialized during training with parameters copied from the predecessor network, which greatly accelerates the training process. For example, a DNN may have been pre-trained to recognize dogs, cats, and other animals, but to obtain a classifier, using the same feature extractor, to recognize different fruits, requires very different parameters.

In some example embodiments, the Softmax function is used as the final layer (classifier) 214. The Softmax function, or normalized exponential function, is a generalization of the logistic function that "compresses" a K-dimensional vector z of arbitrary real values to a K-dimensional vector σ(z) of real values in the range [0, 1] and that add up to 1. The function σ(z) is calculated with the following equation:

$$\sigma(z)_j = \frac{e^{z_j}}{\sum_{k=1}^{K} e^{z_k}}, \text{ for } j = 1, \ldots, K. \quad (1)$$

In probability theory, the output of the Softmax function can be used to represent a categorical distribution, e.g., a probability distribution over K different possible outcomes. The Softmax function is used in various multiclass classification methods, such as multinomial logistic regression, multiclass linear discriminant analysis, naive Bayes classifiers, and artificial neural networks.

Figure 3:
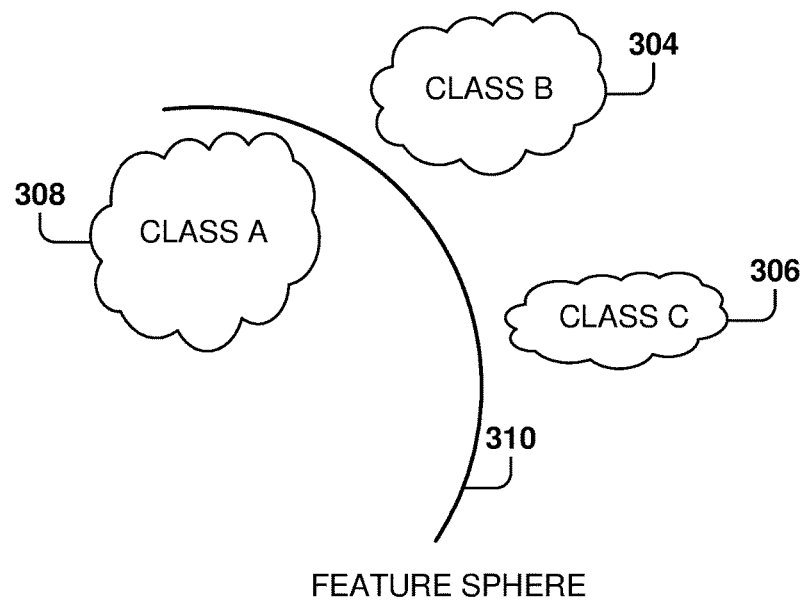
FIG. 3 illustrates the classification of classes when using bias and without retraining, according to some example embodiments.

FIG. 3 illustrates the classification of classes when using bias and with parameters randomly initialized, according to some example embodiments. As used herein, "with parameters randomly initialized" refers to a neural network with a classifier that is trained without parameters being initialized from a previously-trained neural network. With parameters randomly initialized means that the parameters of the last layer, which is responsible for classification, are initialized using random numbers, as discussed in more detail below. On the other hand, with parameters initialized to have values which are estimated to approximate the optimal solution, embodiments presented initialize the parameters of the last layer using approximately optimal values based on previous trainings of the neural network, so the training time is significantly reduced. More details are provided below for a neural network with retraining in reference to FIGS. 5 and 6.

FIG. 3 illustrates one example of the features extracted with Softmax. The graph illustrates a hyperspace where the vectors associated with each class as situated. Class A area 308 includes the vectors for class A, class B area 304 for the vectors of class B, and class C area 306 for the vectors of class C, which means that the vectors for one class are close in space and have similar norms (e.g., length or size of the feature vector). A hyper-sphere 310 separates class A from class B and C. Thus, features having vectors with the same norm are located on the same hyper-sphere.

A common method for initial condition construction is to leverage an existing neural network, having similar structure to the target neural network, where the existing neural network has been trained for a general purpose (e.g., a process called fine-tuning). More specifically, at the initial stage, the lower-level layers of the model to be trained are typically set to have the same parameters as the pre-trained model, while the parameters of the last layer are set to be random numbers sampled from certain distributions (usually Gaussian). This is mainly because the lower-level layers tend to be more general, while the last layer is tightly defined for a specific task. For example, for tasks including Flickr style estimation, flower recognition, and places recognition, the network may be trained by fine-tuning from a neural network for general image recognition trained with ImageNet.

In some example embodiments, the predecessor network is defined as having two parts: a feature extractor ø(·), which corresponds to a stack of layers, and a Softmax layer. Typically, the Softmax layer estimates the probability $y_k(x_i, w, b)$, for the $k^{th}$ component of the probability output y, that the $i^{th}$ sample $x_i$ belongs to the $k^{th}$ class, as follows:

$$y_k(x_i, w, b) = \frac{\exp w_k^T \phi(x_i) + b_k}{\sum_j (\exp w_j^T \phi(x_i) + b_j)} \quad (2)$$

In equation (2), ø(x) non-linearly transforms the sample z to the embedded feature domain, $w_k$ is the weight vector for the $k^{th}$ class, $b_k$ is the bias for the $k^{th}$ class, and ø($x_i$) includes the features extracted from image z. As used herein, unless otherwise specified, $w_k$ and $b_k$ refer to the weight vector and the bias of the classifier. T refers to the transpose operation.

Figure 4:
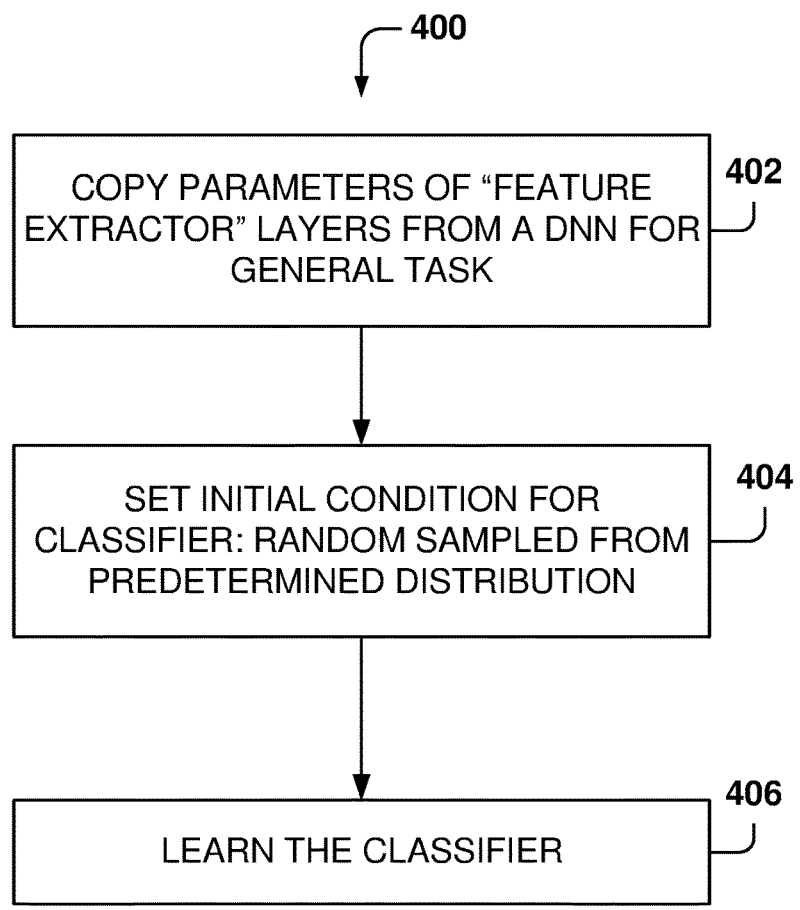
FIG. 4 is a flowchart of a method for training a machine-learning program for a specific task without retraining, according to some example embodiments.

FIG. 4 is a flowchart of a method 400 for training a machine-learning program for a specific task without retraining, according to some example embodiments. While the various operations in this flowchart are presented and described sequentially, one of ordinary skill will appreciate that some or all of the operations may be executed in a different order, be combined or omitted, or be executed in parallel.

At operation 402, a copy of the parameters of the feature extractor layers from a DNN configured for a general task is made, as discussed above. From operation 402, the method flows to operation 404 to set an initial condition for the classifier, where the initial condition includes random samples from the predetermined distribution (e.g., Gaussian distribution).

From operation 404, the method flows to operation 406 to learn the classifier, e.g., train the classifier with the training data based on the initial condition set at operation 404.

Figure 5:
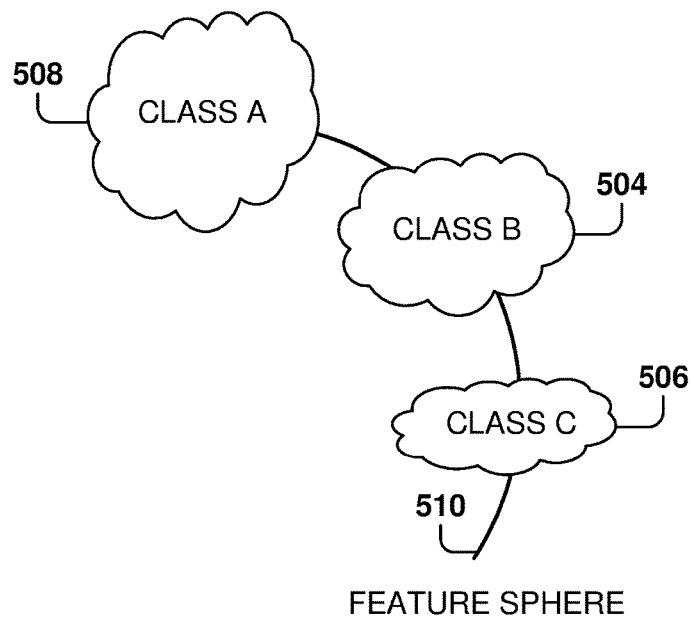
FIG. 5 illustrates the classification of classes without using bias and with initial weight-parameter setting, according to some example embodiments.

FIG. 5 illustrates the classification of classes without using bias and with initial weight-parameter setting, according to some example embodiments. In some example embodiments, the bias term is eliminated (e.g., set to zero in the probability function. More specifically, the probability $y_k^0(x,w)$ that the sample $x_i$ belongs to the $k^{th}$ class is calculated with equation (3) 502 as:

$$y_k^0(x, w) = \frac{\exp w_k^T \phi(x_i)}{\sum_j (\exp w_j^T \phi(x_i))} \quad (3)$$

In some example embodiments, the predecessor network is retrained with AlexNet and Residual Network using the ImageNet training data. The Softmax implementations using equations (2) and (3) empirically showed similar performance in terms of top-1 accuracy on the validation set (57.41% with equation (2) and 58.04% with equation (3)).

A possible explanation of the similar performance without the bias term b is that, without the bias term, the multi-layer neural network is highly capable of learning features for different classes locating in different cones and with similar norms, and thus can separate the different classes based on the weighting vectors. For example, class A 508, class B 504, and class C 506 are situated on the same feature sphere 510, but separated from each other in different respective cones of the hyperspace.

Further, the lower-level layers of the successor network share the same parameters as the lower-level layers of the predecessor network (e.g., feature extraction layers). In some example embodiments, the initial condition for the classifier of the successor network is changed with reference to the embodiments illustrated in FIG. 3. The weight vector $w_k^0$ for the classifier layer of the successor network is initialized as follows:

$$w_k^0 = \frac{1}{|C_k|} \alpha_k \sum_{i \in C_k} \phi(x_i) \qquad (4)$$

Where $C_k$ defines the set of the indexes for the samples which belongs to the $k^{th}$ class, and the parameter $\alpha_k$ sets the norm of the weight vector to an empirical value. Further, by using equation (4), the weight vector $w_k^0$ is initialized to have the same direction as the average of the vectors ø($x_i$), where i∈$C_k$.

The feature vector ø(x) is extracted, using the predecessor network, from the $i^{th}$ image $x_i$ for the new, specific task. $C_k$ is used to denote the set of the index for images which belong to the $k^{th}$ class. In other words, the right side of equation (4) is the averaged features for the $k^{th}$ class in the new specific task for the successor network. The rationale behind this operation is that the initial value of the weight vector $w_k^0$ should have the same direction as the averaged feature value for the corresponding classes, since we aim to have $w_k^T$ø(x) in $C_k$ have a large value.

The previous equation (4) is used to initialize the weight vector for DNNs with Softmax as the last layer. In some example embodiments, the weight vector is initialized for DNNs with multiple binary classifiers as the last layer for multi-label scenarios. In this case, $\bar{x}_k$, the average of feature vectors within the $k^{th}$ cluster is calculated as:

$$\bar{x}_k = \frac{1}{|C_k|} \sum_{i \in C_k} \phi(x_i) \qquad (5)$$

In addition, $\bar{x}^{/k}$, the average of feature vectors for all the samples except the $k^{th}$ cluster is calculated as:

$$\bar{x}^{/k} = \frac{1}{\sum_{j \neq k} |C_j|} \sum_{i \notin C_k} \phi(x_i) \qquad (6)$$

Thus, the weight vector $w_k^0$ for the $k^{th}$ class may be initialized utilizing $\bar{x}_k$ and $\bar{x}^{/k}$, as follows:

$$w_k^0 = \beta_k (\bar{x}_k - \bar{x}^{/k}) \qquad (7)$$

Where the parameter $\beta_k$ is used to set the norm of the weight vector to an empirical value.

Comparing equations (2) and (3), it can be observed that the difference is the elimination of the bias b. Further, $x_i$ is an image and ø($x_i$) is the features extracted from this image, with a weighting vector w. The bias b here acts as a scaler used to separate classes. When b is present, the classes can be located anywhere in the feature space, e.g., inside the hyper-sphere 310 or outside the hyper-sphere 310; they can be anywhere.

However, when the bias term is removed, all the classes tend to locate themselves on the same hyper-sphere 510, and all the vectors go through the coordinates origin point. The weighting vector $w_k$ has to go through the origin because there is no bias. This is a useful property for the feature extractor because when the feature extractor is applied on the new task, trained using the new class function, the different classes will locate themselves on the hyper-sphere as illustrated in FIG. 5. They are separated, but on the same hyper-sphere. Further, the feature vectors from the different classes will have similar norms in the feature space, making it easier to find a separation (e.g., the parameters) to separate classes.

It may appear that the feature extractor won't operate as well without the bias term, but given the great flexibility of the feature extractor, the feature extractor, in the form of multi-layer neural network, can be trained to compensate this simpler functional form by separating the classes without the bias.

The advantage with this approach is that the feature extractor has to be trained once and the feature extractor doesn't have to be trained again and again. After the feature extractor is trained once, the feature extractor may be used for different tasks, and the training time with this approach is greatly reduced. It is also believed that if the same amount of time were used to train with this approach (by using more iterations), then the accuracy would be better than with the algorithm illustrated in FIGS. 3-4.

Figure 6:
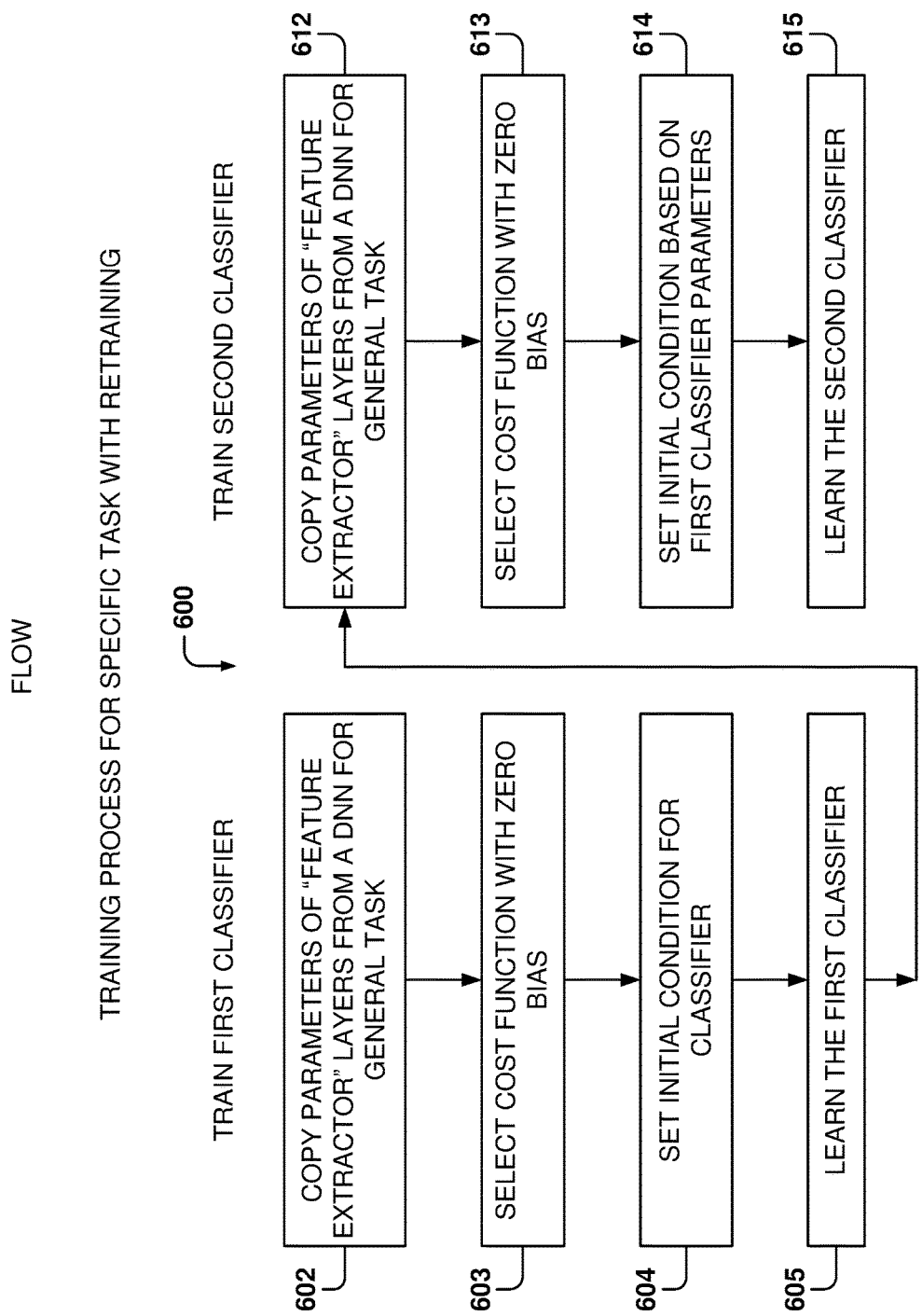
FIG. 6 is a flowchart of a method for training the machine-learning program with retraining, according to some example embodiments.

FIG. 6 is a flowchart of a method 600 for training the machine-learning program with retraining, according to some example embodiments. While the various operations in this flowchart are presented and described sequentially, one of ordinary skill will appreciate that some or all of the operations may be executed in a different order, be combined or omitted, or be executed in parallel.

The method 600 includes operations 602-605 to train the first classifier (the predecessor network) and operations 612-615 to train the second classifier (the successor network). At operation 602, the parameters of the feature extractor layers are copied from a DNN configured for performing general tests.

From operation 602, the method flows to operation 603 for selecting a cost function with zero bias, such as equation (3). From operation 603, the method flows to operation 604 where the initial condition for the classifier is set. As discussed earlier, the initial condition is based on a random distribution.

From operation 604, the method flows to operation 605 were the first classifier is learned by performing the training operation with the training data. From operation 605, the method flows to operation 612 when training for the second classifier is started. At operation 612, the parameters of the feature extractor layers are copied from the DNN for the general task.

From operation 612, the method flows to operation 613 where the cost function with zero bias is selected, such as equation (3). From operation 613, the method flows to operation 614, where the initial condition is set based on the parameters of the first classifier. See for example equation (4). From operation 614, the method flows to operation 615 to learn the second classifier.

Figure 7:
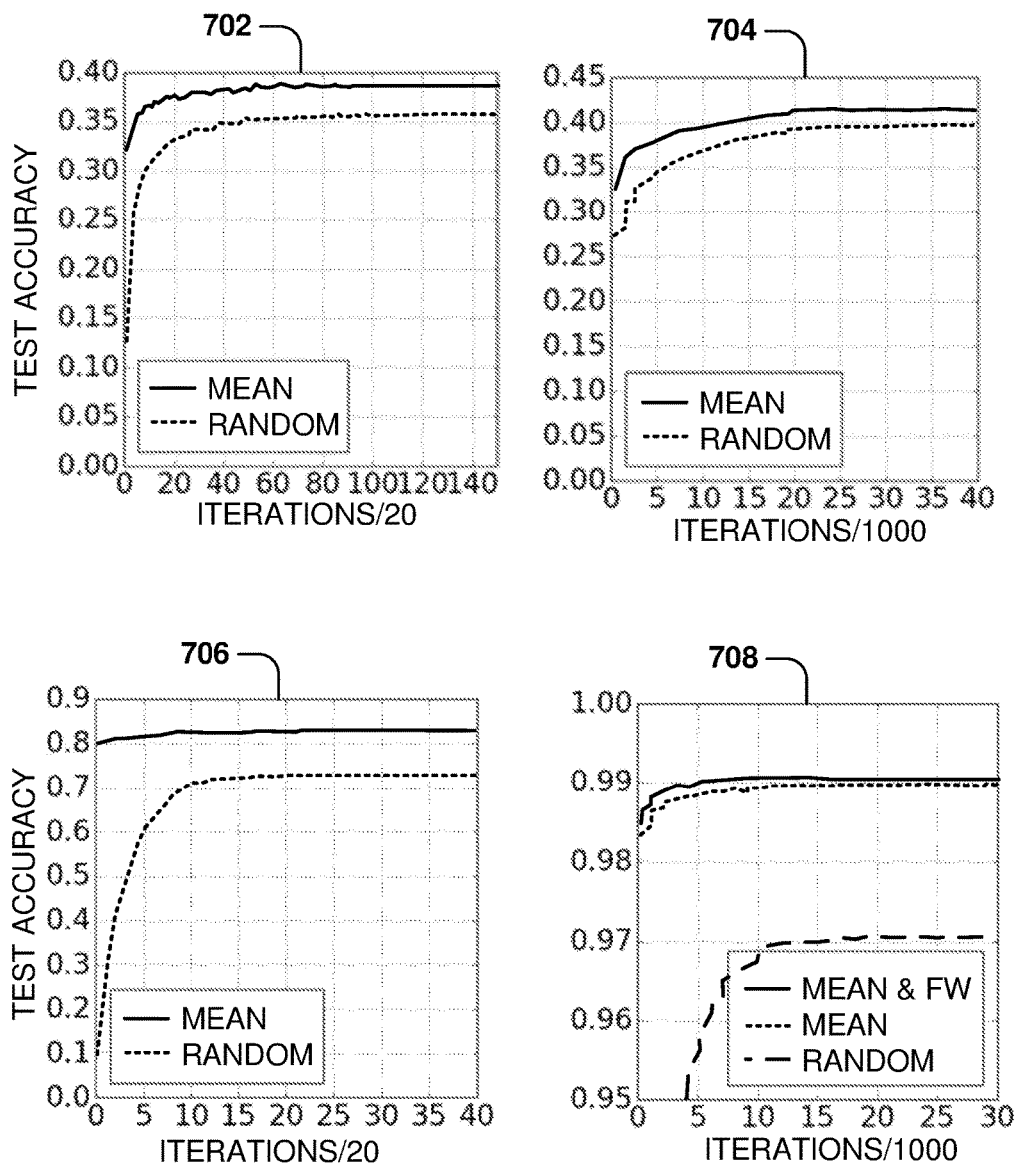
FIG. 7 illustrates some experimental measurements showing the faster tool-training times with the successor network, according to some example embodiments.

FIG. 7 illustrates some experimental measurements showing the faster tool-training times with the successor network, according to some example embodiments. It is noted that the experimental results illustrated in FIG. 7 are examples and do not describe every possible embodiment. The results should therefore not be interpreted to be exclusive or limiting, but rather illustrative.

The charts 702, 704, 706, and 708 illustrate the accuracy results based on the number of iterations for the training, for both the "random" initial distribution for the classifier and the preset condition set based on the predecessor network, referred to as "mean."

The method was evaluated in a multi-class classification setup. The AlexNet DNN was trained with ImageNet data, with the modified Softmax, as illustrated in equation (3) as the predecessor network, and estimated the initial condition by setting the last layer of the successor network using equation (4).

The parameters of the lower-level layers were fixed. The tasks tested include Flickr-style estimation 702, flower recognition 704, and places recognition 706. The method "mean" includes setting the parameters of the last layer using equation (4), while the method "random" includes setting the parameters of the last layer using random numbers following a certain distribution, which is the conventional method. As shown, the "mean" method reduces the number of iterations needed to achieve the same performance by three to five times.

Chart 708 also shows the result when using a different feature extractor for face recognition, as a reference to experiment with a different extractor, which showed similar results.

Figure 8:
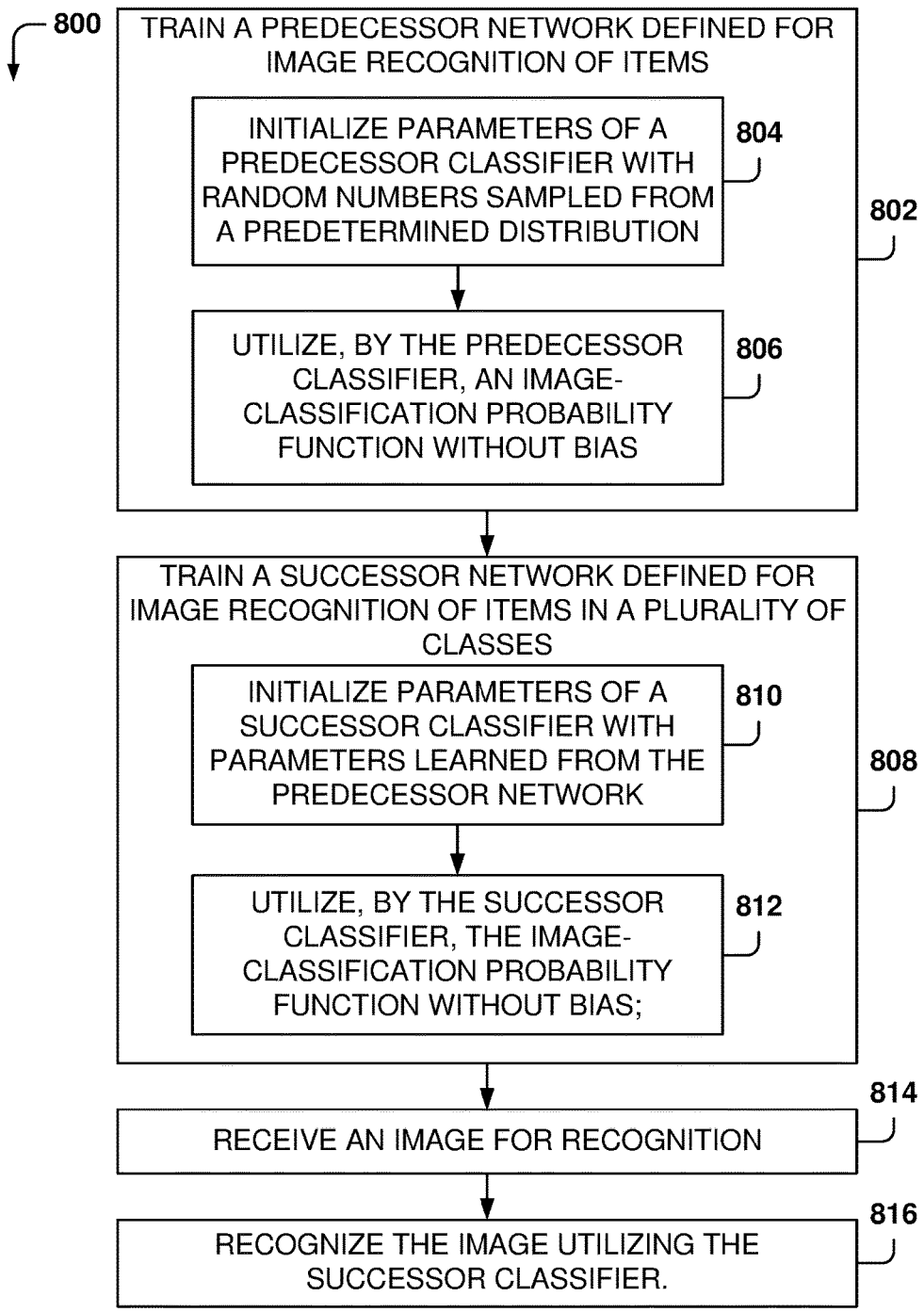
FIG. 8 is a flowchart of a method for training a deep neural network (DNN), according to some example embodiments.

FIG. 8 is a flowchart of a method for training a deep neural network (DNN), according to some example embodiments. While the various operations in this flowchart are presented and described sequentially, one of ordinary skill will appreciate that some or all of the operations may be executed in a different order, be combined or omitted, or be executed in parallel.

Operation 802 is for training, by one or more processors, a predecessor network defined for image recognition of items. The training of the predecessor network further comprises operations 804 and 806. Operation 804 is for initializing parameters of a predecessor classifier with random numbers sampled from a predetermined distribution, and operation 806 is for utilizing, by the predecessor classifier, an image-classification probability function without bias.

From operation 802, the method flows to operation 808 for training, by the one or more processors, a successor network defined for image recognition of items in a plurality of classes. The training of the successor network further comprises operations 810 and 812. Operation 810 is for initializing parameters of a successor classifier with parameters learned from the predecessor network, and operation 812 is for utilizing, by the successor classifier, the image-classification probability function without bias.

From operation 808, the method flows to operation 814 where an image is received for recognition. At operation 816, the one or more processors recognize the image utilizing the successor classifier.

In one example, initializing parameters of the successor classifier further comprises initializing a weight vector $w_k$ for a class k based on a set of indexes for training samples which belong to the k class.

In one example, initializing parameters of the successor classifier further comprises initializing the weight vector $w_k$ for the class k further based on an average direction of vectors for the class k in the predecessor network.

In one example, vectors for a same class are located substantially on a same hyper-sphere.

In one example, the predecessor network includes a plurality of feature-extraction layers and the predecessor classifier, where the successor network includes the plurality of feature-extraction layers and the successor classifier.

In one example, the image-classification probability function for a sample image x in class k is based on a weight vector w and features extracted from the sample image x by the feature-extraction layers.

In one example, the feature-extraction layers of the successor network share same parameters as the feature-extraction layers of the predecessor network.

Figure 9:
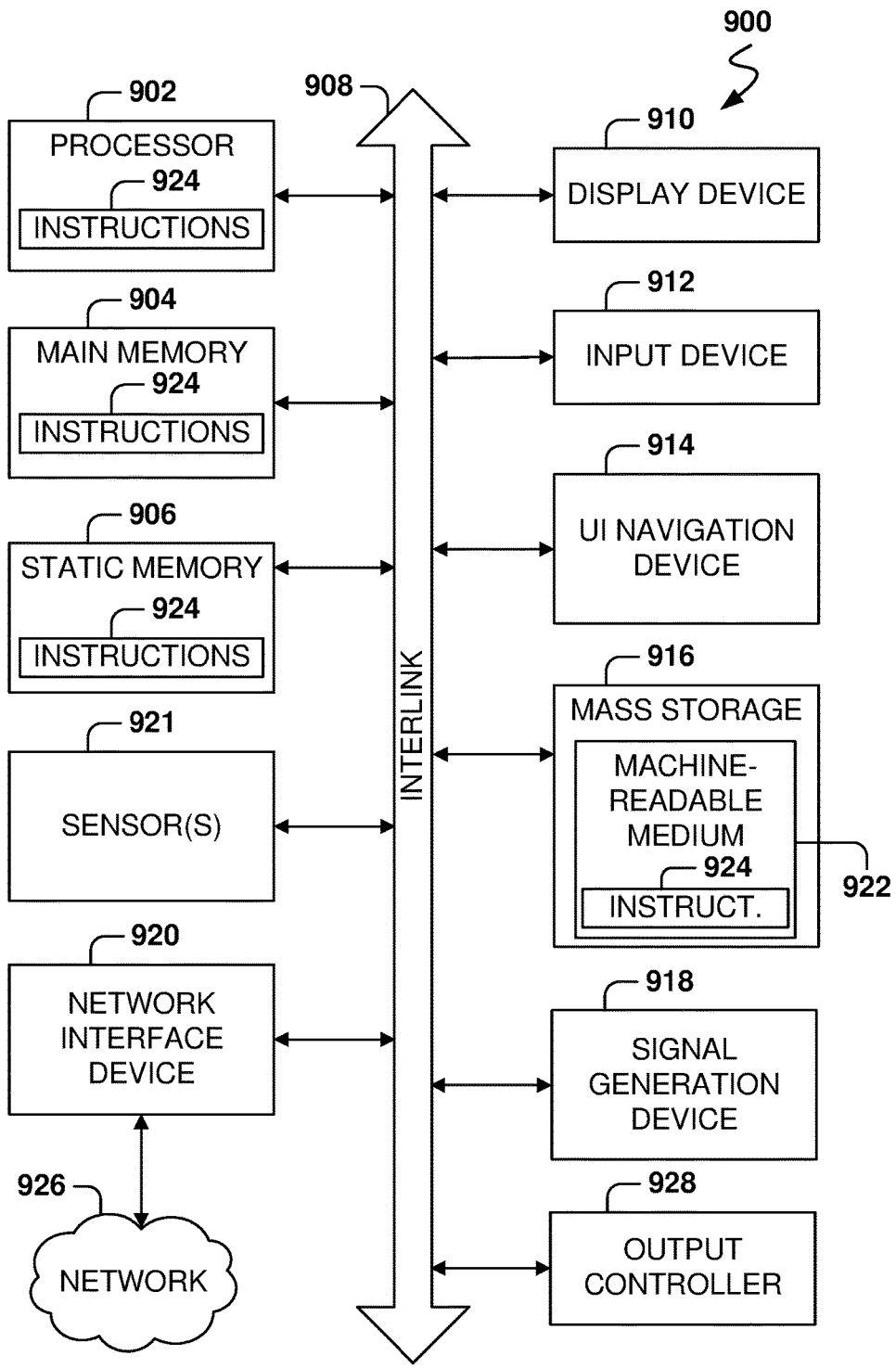
FIG. 9 is a block diagram illustrating an example of a machine upon which one or more example embodiments may be implemented.

FIG. 9 is a block diagram illustrating an example of a machine 900 upon which one or more example embodiments may be implemented. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 900 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a graphics processing unit (GPU), a hardware processor core, or any combination thereof), a main memory 904, and a static memory 906, some or all of which may communicate with each other via an interlink (e.g., bus) 908. The machine 900 may further include a display device 910, an alphanumeric input device 912 (e.g., a keyboard), and a UI navigation device 914 (e.g., a mouse). In an example, the display device 910, input device 912, and UI navigation device 914 may be a touchscreen display. The machine 900 may additionally include a mass storage device (e.g., drive unit) 916, a signal generation device 918 (e.g., a speaker), a network interface device 920, and one or more sensors 921, such as a GPS sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the mass storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that causes the machine 900 to perform any one or more of the techniques of the present disclosure, or that is capable of storing, encoding or carrying data structures used by or associated with such instructions 924. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 902.11 family of standards known as Wi-Fi®, IEEE 902.16 family of standards known as WiMax®), IEEE 902.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    training, by one or more processors, a predecessor network defined for image recognition of items, the training of the predecessor network further comprising:
        initializing parameters of a predecessor classifier with random numbers sampled from a predetermined distribution; and
        utilizing, by the predecessor classifier, an image-classification probability function without bias;

training, by the one or more processors, a successor network defined for image recognition of items in a plurality of classes, the training of the successor network further comprising:
   initializing parameters of a successor classifier with parameters learned from the predecessor network; and
   utilizing, by the successor classifier, the image-classification probability function without bias;
receiving, by the one or more processors, an image for recognition; and
recognizing, by the one or more processors, the image utilizing the successor classifier.

2. The method as recited in claim 1, wherein initializing parameters of the successor classifier further comprises:
   initializing a weight vector $w_k$ for a class k based on a set of indexes for training samples which belong to the k class.

3. The method as recited in claim 2, wherein initializing parameters of the successor classifier further comprises:
   initializing the weight vector $w_k$ for the class k further based on an average direction of vectors for the class k in the predecessor network.

4. The method as recited in claim 2, wherein vectors for a same class are located substantially on a same hyper-sphere, wherein a hyper-plane separating classes goes through an origin point.

5. The method as recited in claim 1, wherein the predecessor network includes a plurality of feature-extraction layers and the predecessor classifier, wherein the successor network includes the plurality of feature-extraction layers and the successor classifier.

6. The method as recited in claim 5, wherein the image-classification probability function for a sample image x in class k is based on a weight vector w and features extracted from the sample image x by the feature-extraction layers.

7. The method as recited in claim 5, wherein the feature-extraction layers of the successor network share same parameters as the feature-extraction layers of the predecessor network.

8. A system comprising:
   a memory comprising instructions; and
   one or more computer processors, wherein the instructions, when executed by the one or more computer processors, cause the one or more computer processors to perform operations comprising:
      training a predecessor network defined for image recognition of items, the training of the predecessor network further comprising:
         initializing parameters of a predecessor classifier with random numbers sampled from a predetermined distribution; and
         utilizing, by the predecessor classifier, an image-classification probability function without bias;
      training a successor network defined for image recognition of items in a plurality of classes, the training of the successor network further comprising:
         initializing parameters of a successor classifier with parameters learned from the predecessor network; and
         utilizing, by the successor classifier, the image-classification probability function without bias;
      receiving an image for recognition; and
      recognizing the image utilizing the successor classifier.

9. The system as recited in claim 8, wherein initializing parameters of the successor classifier further comprises:
   initializing a weight vector $w_k$ for a class k based on a set of indexes for training samples which belong to the k class.

10. The system as recited in claim 9, wherein initializing parameters of the successor classifier further comprises:
   initializing the weight vector $w_k$ for the class k further based on an average direction of vectors for the class k in the predecessor network.

11. The system as recited in claim 9, wherein vectors for a same class are located substantially on a same hyper-sphere, wherein a hyper-plane separating classes goes through an origin point.

12. The system as recited in claim 8, wherein the predecessor network includes a plurality of feature-extraction layers and the predecessor classifier, wherein the successor network includes the plurality of feature-extraction layers and the successor classifier.

13. The system as recited in claim 12, wherein the image-classification probability function for a sample image x in class k is based on a weight vector w and features extracted from the sample image x by the feature-extraction layers.

14. A non-transitory machine-readable storage medium including instructions that, when executed by a machine, cause the machine to perform operations comprising:
   training a predecessor network defined for image recognition of items, the training of the predecessor network further comprising:
      initializing parameters of a predecessor classifier with random numbers sampled from a predetermined distribution; and
      utilizing, by the predecessor classifier, an image-classification probability function without bias;
   training a successor network defined for image recognition of items in a plurality of classes, the training of the successor network further comprising:
      initializing parameters of a successor classifier with parameters learned from the predecessor network; and
      utilizing, by the successor classifier, the image-classification probability function without bias;
   receiving an image for recognition; and
   recognizing the image utilizing the successor classifier.

15. The machine-readable storage medium as recited in claim 14, wherein initializing parameters of the successor classifier further comprises:
   initializing a weight vector $w_k$ for a class k based on a set of indexes for training samples which belong to the k class.

16. The machine-readable storage medium as recited in claim 15, wherein initializing parameters of the successor classifier further comprises:
   initializing the weight vector $w_k$ for the class k further based on an average direction of vectors for the class k in the predecessor network.

17. The machine-readable storage medium as recited in claim 15, wherein vectors for a same class are located substantially on a same hyper-sphere, wherein a hyper-plane separating classes goes through an origin point.

18. The machine-readable storage medium as recited in claim 14, wherein the predecessor network includes a plurality of feature-extraction layers and the predecessor classifier, wherein the successor network includes the plurality of feature-extraction layers and the successor classifier.

19. The machine-readable storage medium as recited in claim 18, wherein the image-classification probability function for a sample image x in class k is based on a weight vector w and features extracted from the sample image x by the feature-extraction layers.

20. The machine-readable storage medium as recited in claim 18, wherein the feature-extraction layers of the successor network share same parameters as the feature-extraction layers of the predecessor network.

* * * * *